United States Patent
Mainali et al.

(10) Patent No.: US 11,803,511 B2
(45) Date of Patent: Oct. 31, 2023

(54) METHODS AND SYSTEMS FOR ORDERING OPERATIONS ON A FILE SYSTEM HAVING A HIERARCHICAL NAMESPACE

(71) Applicant: Microsoft Technology Licensing, LLC, Redmond, WA (US)

(72) Inventors: Shane Mainali, Duvall, WA (US); Ramy Wassef, Woodinville, WA (US); Vamshi Konagari, Redmond, WA (US); Hao Wang, Redmond, WA (US); James Baker, Kirkland, WA (US); Jegan Devaraju, Redmond, WA (US); Sandesh Doddameti, Seattle, WA (US); Maneesh Sah, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 54 days.

(21) Appl. No.: 17/453,768

(22) Filed: Nov. 5, 2021

(65) Prior Publication Data
US 2023/0147552 A1    May 11, 2023

(51) Int. Cl.
*G06F 16/11* (2019.01)
*G06F 16/17* (2019.01)
(Continued)

(52) U.S. Cl.
CPC .......... *G06F 16/125* (2019.01); *G06F 9/4887* (2013.01); *G06F 16/1734* (2019.01); *G06F 16/185* (2019.01)

(58) Field of Classification Search
CPC .............. G06F 16/1734; G06F 16/182; G06F 16/1873; G06F 16/245; G06F 16/125; G06F 16/185
(Continued)

(56) References Cited

U.S. PATENT DOCUMENTS

| | | | |
|---|---|---|---|
| 7,496,565 B2* | 2/2009 | Thind | G06F 16/166 707/999.009 |
| 7,752,226 B1* | 7/2010 | Harmer | G06F 16/13 707/796 |
| 7,761,497 B1* | 7/2010 | O'Connell, Jr. | G06F 16/9574 709/215 |

(Continued)

OTHER PUBLICATIONS

"Azure Storage Documentation", Retrieved from: https://docs.microsoft.com/en-us/azure/storage/, Retrieved Date: Feb. 27, 2021, 3 Pages.

(Continued)

*Primary Examiner* — Shahid A Alam
(74) *Attorney, Agent, or Firm* — SHOOK, HARDY & BACON L.L.P.

(57) ABSTRACT

Example aspects include techniques for ordering operations in a file system having a hierarchical namespace including determining, by a first service that manages file system operations for a first entity in the hierarchical namespace, to perform a file system operation for the first entity, generating, by the first service, a first counter record for the file system operation, obtaining, based on determining to perform the file system operation and from a second service that manages file system operations on a second entity that is a parent of the entity in the hierarchical namespace, a second counter record for a last file system operation performed on the second entity, wherein the second counter record is generated by the second service, and storing, in a change feed, an indication of the file system operation along with the first counter record and the second counter record.

20 Claims, 9 Drawing Sheets

(51) Int. Cl.
  *G06F 16/185* (2019.01)
  *G06F 9/48* (2006.01)
(58) Field of Classification Search
  USPC .......................................................... 707/694
  See application file for complete search history.

(56) References Cited

U.S. PATENT DOCUMENTS

| | | | | |
|---|---|---|---|---|
| 8,041,735 | B1* | 10/2011 | Lacapra | G06F 16/182 |
| | | | | 707/783 |
| 8,185,630 | B2* | 5/2012 | Pitts | G06F 16/10 |
| | | | | 709/201 |
| 9,020,994 | B1* | 4/2015 | Hilliar | G06F 16/137 |
| | | | | 707/827 |
| 9,367,579 | B1 | 6/2016 | Kumar et al. | |
| 9,930,373 | B2* | 3/2018 | Zucchetta | G06F 21/10 |
| 9,984,090 | B1* | 5/2018 | Shang | G06F 16/13 |
| 10,528,546 | B1 | 1/2020 | Aron et al. | |
| 10,684,992 | B1 | 6/2020 | Marks et al. | |
| 10,735,369 | B2 | 8/2020 | Chalakov et al. | |
| 10,789,217 | B2 | 9/2020 | Chalakov et al. | |
| 10,817,498 | B2 | 10/2020 | Chalakov et al. | |
| 10,831,720 | B2 | 11/2020 | Mainali et al. | |
| 2006/0179037 | A1* | 8/2006 | Turner | G06F 16/10 |
| 2015/0058291 | A1* | 2/2015 | Earl | G06F 16/1734 |
| | | | | 707/625 |
| 2015/0058384 | A1* | 2/2015 | Karamanolis | G06F 16/27 |
| | | | | 707/827 |
| 2015/0347553 | A1* | 12/2015 | Aizman | G06F 16/273 |
| | | | | 707/613 |
| 2017/0091296 | A1* | 3/2017 | Beard | G06F 16/1734 |
| 2018/0181582 | A1 | 6/2018 | Keymolen et al. | |
| 2019/0370362 | A1 | 12/2019 | Mainali et al. | |
| 2019/0392053 | A1* | 12/2019 | Chalakov | G06F 16/137 |
| 2020/0336455 | A1* | 10/2020 | Chalakov | G06F 16/152 |

OTHER PUBLICATIONS

"Building File System Semantics for an Exabyte Scale Object Storage System (SDC 2019)", Retrieved from: https://www.youtube.com/watch?v=xgcWkdTtlbl&list=PLH_ag5Km-YUY9kkdOYujfrdQjElh83aNF&index=73, Oct. 14, 2019, 4 Pages.
"Connectivity (Graph Theory)", Retrieved from: https://en.wikipedia.org/wiki/Connectivity_(graph_theory), Aug. 26, 2021, 7 Pages.
"Databricks File System", Retrieved from: https://docs.databricks.com/data/databricks-file-system.html, Oct. 20, 2021, 21 Pages.
"Gossiper", Retrieved from: https://cwiki.apache.org/confluence/display/CASSANDRA2/ArchitectureGossip, Jan. 2, 2010, 5 Pages.
"HDFS Architecture Guide", Retrieved from: https://hadoop.apache.org/docs/r1.2.1/hdfs_design.html, Oct. 10, 2020, 12 Pages.
Estabrook, et al., "Introduction to Azure Data Lake Storage Gen2", Retrieved from: https://docs.microsoft.com/en-us/azure/storage/blobs/data-lake-storage-introduction, Oct. 7, 2021, 6 Pages.
"Lua the Programming Language", Retrieved from: http://www.lua.org:80/, Retrieved Date: Feb. 27, 2021, 1 Page.
"Microsoft Azure Blog", Retrieved from: https://azure.microsoft.com/en-us/blog/, Nov. 2, 2021, 9 Pages.
"Multiversion Concurrency Control", Retrieved from: https://en.wikipedia.org/wiki/Multiversion_concurrency_control, Sep. 15, 2021, 5 Pages.
"Nested Set Model", Retrieved from: https://en.wikipedia.org/wiki/Nested_set_model, Sep. 26, 2021, 7 Pages.
"Storage, Backup & Recovery", Retrieved from: https://azure.microsoft.com/en-us/blog/topics/storage-backup-and-recovery/, Oct. 26, 2021, 8 Pages.
"The Hadoop FileSystem API Definition", Retrieved from: http://hadoop.apache.org/docs/current/hadoop-project-dist/hadoop-common/filesystem/index.html, Aug. 17, 2014, 1 Page.
"Trees", Retrieved from: https://web.archive.org/web/20110901025938/https://vadimtropashko.files.wordpress.com/2011/07/ch5.pdf, Sep. 1, 2011, 39 Pages.
"Troels' Links: Relational Database Systems", Retrieved from: https://web.archive.org/web/20031223170923/https://troels.arvin.dk/db/rdbms/links/, Dec. 23, 2003, 9 Pages.
"Vector Clock", Retrieved from: https://en.wikipedia.org/wiki/Vector_clock#/media/File:Vector_Clock, Aug. 20, 2021, 5 Pages.
"Write-ahead Logging", Retrieved from: https://en.wikipedia.org/wiki/Write-ahead_logging, Feb. 26, 2021, 1 Page.
Bradner, S., "Key Words for Use in RFCs to Indicate Requirement Levels", Retrieved from: http://www.ietf.org/rfc/rfc2119.txt, Mar. 1997, 3 Pages.
Calder, et al., "Windows Azure Storage: A Highly Available Cloud Storage Service with Strong Consistency", In Proceedings of the Twenty-Third ACM Symposium on Operating Systems Principles, Oct. 23, 2011, 26 Pages.
Demers, et al., "Epidemic Algorithms for Replicated Database Maintenance", In Proceedings of the Sixth Annual ACM Symposium on Principles of Distributed Computing, Jan. 1989, 28 Pages.
Du, et al., "Clock-SI: Snapshot Isolation for Partitioned Data Stores Using Loosely Synchronized Clocks", In Proceedings of the IEEE 32nd International Symposium on Reliable Distributed Systems, Sep. 30, 2013, 12 Pages.
Hayashibara, et al., "The φ Accrual Failure Detector", In IS-RR-2004-010, May 10, 2004, 16 Pages.
Hazel, Dan, "Using Rational Numbers to Key Nested Sets", In Repository of arXiv:0806.3115v1, Jun. 19, 2008, 18 Pages.
Hillyer's, Mike, "Managing Hierarchical Data in MySQL", Retrieved from: https://web.archive.org/web/20100821223318/http://mikehillyer.com/articles/managing-hierarchical-data-in-mysql/, Aug. 21, 2010, 16 Pages.
Katsov, Ilya, "Distributed Algorithms in NoSQL Databases", Retrieved from: https://highlyscalable.wordpress.com/2012/09/18/distributed-algorithms-in-nosql-databases/, Sep. 18, 2012, 25 Pages.
Khurana, et al. "Causally Ordering Distributed File System Events", In Storage Developer Conference, 2017, 44 Pages.
Lamport, Leslie, "Time, Clocks, and the Ordering of Events in a Distributed System", In Communications of the ACM, vol. 21, Issue 7, Jul. 1978, pp. 558-565.
Myers, et al., "Change Feed Support in Azure Blob Storage", Retrieved from: https://docs.microsoft.com/en-us/azure/storage/blobs/storage-blob-change-feed?tabs=azure-portal, Oct. 3, 2021, 15 Pages.
Neumann, et al., "Fast Serializable Multi-Version Concurrency Control for Main-Memory Database Systems", In Proceedings of the ACM SIGMOD International Conference on Management of Data, May 31, 2015, pp. 677-689.
O'Neil, et al., "The Log-Structured Merge-tree (LSM-Tree)", In Journal of Acta Informatica, vol. 33, Issue 4, Jun. 1996, 32 Pages.
Pelluru, et al., "Azure Blob Storage as an Event Grid source", Retrieved from: https://docs.microsoft.com/en-us/azure/event-grid/event-schema-blob-storage?toc=%2Fazure%2Fstorage%2Fblobs%2Ftoc.json&tabs=event-grid-event-schema, Sep. 9, 2021, 18 Pages.
Roth, et al., "Hierarchical Data (SQL Server)", Retrieved from: https://docs.microsoft.com/en-us/sql/relational-databases/hierarchical-data-sql-server?view=sql-server-ver15, Mar. 18, 2021, 19 Pages.
Schuller, Peter, "Demystify Failure Detector, Consider Partial Failure Handling, Latency Optimizations", Retrieved from: https://issues.apache.org/jira/browse/CASSANDRA-3927, Feb. 17, 2012, 7 Pages.
Tropashko, Vadim, "Trees in SQL: Nested Sets and Materialized Path", Retrieved from: http://www.dbazine.com/oracle/or-articles/tropashko4/, Apr. 22, 2005, 19 Pages.
Welch, et al., "Prefix Tables: A Simple Mechanism for Locating Files in a Distributed System", In Proceedings of 6th International Conference on Distributed Computing Systems, May 19, 1986, pp. 184-189.
Myers, et al., "Naming and Referencing Containers, Blobs, and Metadata", Retrieved from: https://docs.microsoft.com/en-us/rest/api/storageservices/Naming-and-Referencing-Containers--Blobs-and-Metadata, Jul. 21, 2021, 6 Pages.
"Filetime Structure (Minwinbase.h)", Retrieved from: https://docs.microsoft.com/en-us/windows/win32/api/minwinbase/ns-minwinbase-filetime?redirectedfrom=MSDN, Apr. 2, 2021, 4 Pages.

(56) References Cited

OTHER PUBLICATIONS

"International Search Report and Written Opinion Issued in PCT Application No. PCT/US22/040827", dated Dec. 7, 2022, 11 Pages.

* cited by examiner

600 ↘

OBTAIN A CHANGE FEED INCLUDING A LIST OF MULTIPLE FILE SYSTEM OPERATIONS PERFORMED IN A FILE SYSTEM ON VARIOUS NODES, WHERE THE LIST INCLUDES, FOR EACH FILE SYSTEM OPERATION, A SET OF COUNTER RECORDS EACH ASSOCIATED WITH A ENTITY INVOLVED IN THE FILE SYSTEM OPERATION
602

↓

GENERATE AN ORDERED LIST OF MULTIPLE FILE SYSTEM OPERATIONS STORED IN THE CHANGE FEED BASED ON A SET OF COUNTER RECORDS ASSOCIATED WITH EACH OF THE MULTIPLE FILE SYSTEM OPERATIONS
604

*CREATE A DAG HAVING NODES CORRESPONDING TO EACH OF THE MULTIPLE FILE SYSTEM OPERATIONS AND EDGES BETWEEN THE NODES HAVING A DIRECTION DETERMINED BASED ON THE SET OF COUNTER RECORDS CORRESPONDING TO A CORRESPONDING ONE OF THE MULTIPLE FILE SYSTEM OPERATIONS*
  606

*PERFORM A GRAPH TRAVERSAL OF THE DAG TO GENERATE THE ORDERED LIST OF MULTIPLE FILE SYSTEM OPERATIONS*
  608

↓

OUTPUT THE ORDERED LIST OF MULTIPLE FILE SYSTEM OPERATIONS
610

↙ ↘

*EXECUTE THE MULTIPLE FILE SYSTEM OPERATIONS FROM THE ORDERED LIST ON A REDUNDANT FILE SYSTEM*
612

*UTILIZING THE ORDERED LIST TO PROVIDE A POINT-IN-TIME RESTORE OF THE FILE SYSTEM*
614

FIG. 6

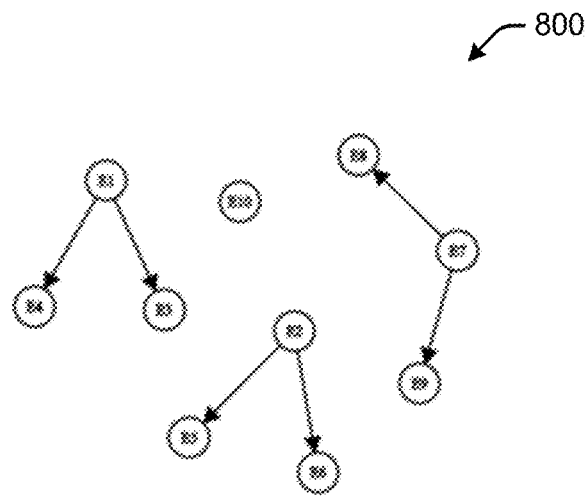
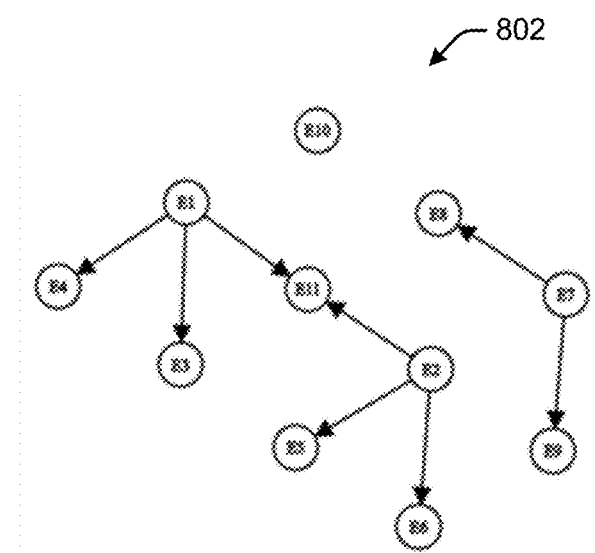
FIG. 8

METHODS AND SYSTEMS FOR ORDERING OPERATIONS ON A FILE SYSTEM HAVING A HIERARCHICAL NAMESPACE

BACKGROUND

A cloud computing environment may provide storage solutions to customers over a network, where storage of files, directories, etc. can be distributed across multiple nodes in the cloud computing environment. Location and access to the files can be provided by a namespace service that can function to include file system structure information, pointers to directories or files in the cloud computing environment, etc. Flat namespaces can be employed where the namespace service manages a link to each file, and each link can have directory or path information related to the file. Using a flat namespace, a request for an operation on a file can be fulfilled by determining path or location information stored in a specific entry for the file in the flat namespace.

Hierarchical namespaces can be employed where each entity in a path or location can have a separate link or entry in the namespace, where an entity can be a directory or file. For example, for a given file in a hierarchical, the file itself can have a namespace entry that links to a separate entry for a first directory (also referred to as a folder) within which the file is stored, and/or the directory entry can link to another entry for its parent directory, etc., which may persist to a starting (or root) directory. Hierarchical namespaces can provide for more efficient operations on directories, such as renaming, deleting, modifying access properties, or other modification, as such operations may only require modifying the namespace entry for the directory, as opposed to a flat namespace, which may also require modification of all files and/or subdirectories as well of the directory being modified. In some implementations, each entity in the file system (e.g., each file or directory block) can have an associated namespace service that executes to facilitate file system operations being performed on the entity, such as creating, removing, or modifying the entity, files within the entity, directories within the entity, etc.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a computer-implemented method for ordering operations in a file system having a hierarchical namespace is provided. The method includes determining, by a first service that manages file system operations for a first entity in the hierarchical namespace, to perform a file system operation for the first entity, generating, by the first service, a first counter record for the file system operation, obtaining, based on determining to perform the file system operation and from a second service that manages file system operations on a second entity that is a parent of the entity in the hierarchical namespace, a second counter record for a last file system operation performed on the second entity, wherein the second counter record is generated by the second service, and storing, in a change feed, an indication of the file system operation along with the first counter record and the second counter record.

In another aspect, a cloud computing device for ordering operations in a file system having a hierarchical namespace is provided that includes a memory storing instructions, and at least one processor coupled to the memory. The at least one processor is configured to execute the instructions to determine, by a first service that manages file system operations for a first entity in the hierarchical namespace, to perform a file system operation for the first entity, generate, by the first service, a first counter record for the file system operation, obtain, based on determining to perform the file system operation and from a second service that manages file system operations on a second entity that is a parent of the entity in the hierarchical namespace, a second counter record for a last file system operation performed on the second entity, wherein the second counter record is generated by the second service, and store, in a change feed, an indication of the file system operation along with the first counter record and the second counter record.

In another aspect, an example computer-readable medium storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 6 is a flow diagram illustrating an example of a method for sorting a change feed, in accordance with some aspects of the present disclosure.

FIG. 8 illustrates various states of a DAG generated for sorting a change feed including creating partitions, in accordance with some aspects of the present disclosure.

DETAILED DESCRIPTION

Figure 1:
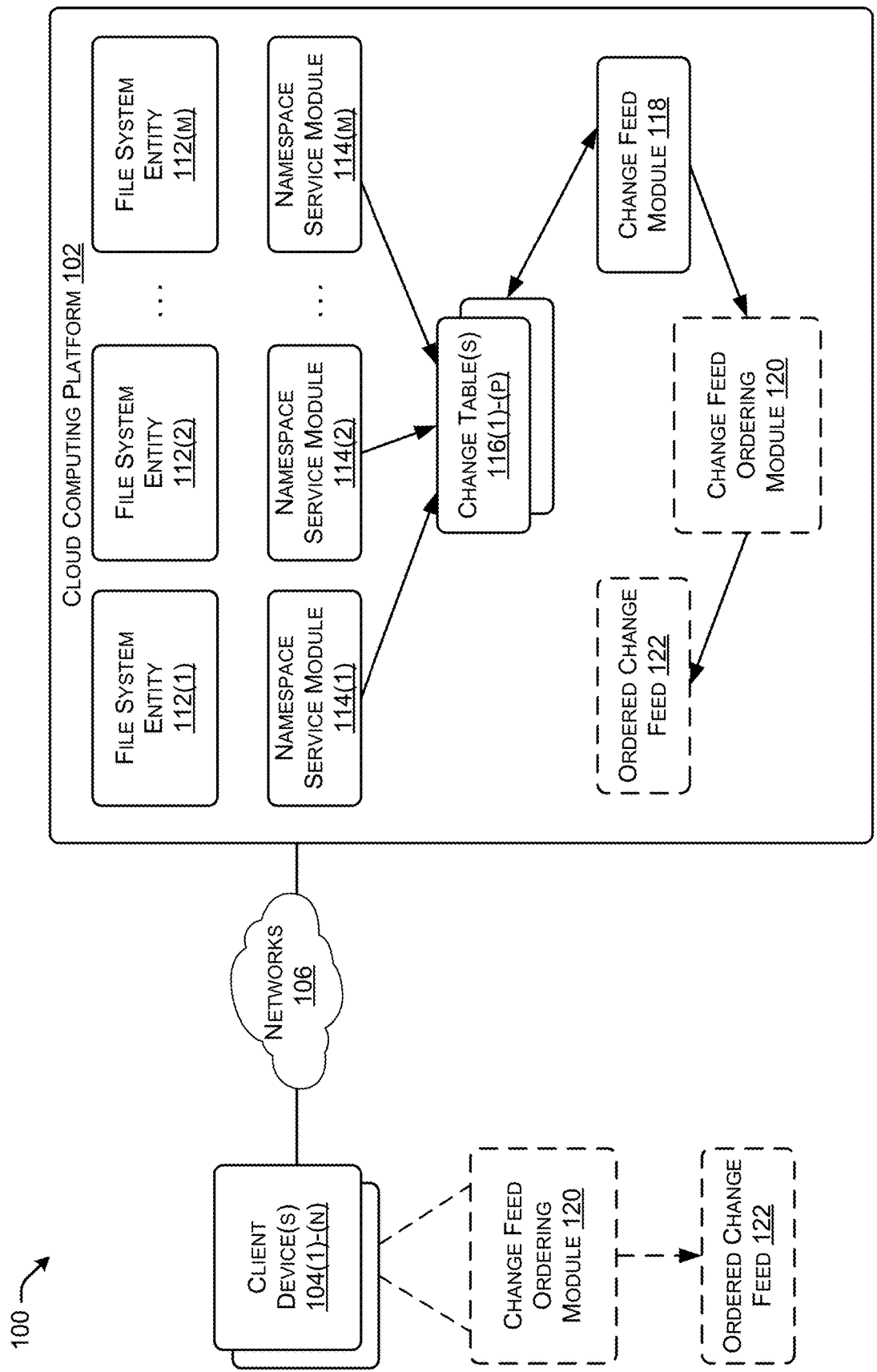
FIG. 1 is a diagram showing an example of a cloud computing system, in accordance with some aspects of the present disclosure

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for ordering, in a change feed, operations performed on a file system having a hierarchical namespace. For example, the change feed can include a list (e.g., a log) of file system operations performed on the file system and can be used to implement redundant storage for the file system, provide a point-in-time restore of the file system, etc. In hierarchical namespaces, entries in a namespace (e.g., in a table or other data structure that represents the namespace) can depend from one another. As described, for example, a hierarchical namespace can include a single entry for a directory, and each file or subdirectory in the directory can have an entry that depends on the directory entry, which can allow for efficient modification of the directory based on modifying the directory entry without requiring modification of entries for files or subdirectories.

Based on this dependency, however, order of at least some operations can become important and/or critical. For example, for a first operation to change access to a directory to allow for creating a subdirectory that occurs before a second operation to create the subdirectory, the change feed should list the first operation before the second operation. As each file system entity (e.g., file or directory) can have a separately executing namespace service (e.g., which may be executing on a different computing device in a cloud computing platform), the order in which operations are written to the change feed may vary due to various considerations, such as delay at the namespace service or on a computing device executing the namespace service, propagation delay in a path from the namespace service to the change feed, etc. In addition, each namespace service or corresponding computing device may have a different clock, and as such any timestamps may not be atomic among namespace services.

Accordingly, aspects described herein relate to ordering file system operations in a change feed for hierarchical namespaces. In an example, for a given file system operation, a namespace service for an entity can generate a counter record for the file system operation that is monotonically increasing for the namespace service. As such, the counter record for a given namespace service may be a counter, vector clock, system clock, etc., as described further herein. The namespace service can also obtain a last counter record value for one or more parent entities of the entity involved in the file system operation. The namespace service can log the file system operation in the change feed along with the counter records.

A change feed sorting module is also provided for ordering (e.g., sorting) the file system operations in the change feed to generate an ordered change feed based on the counter record for each entity. For example, the change feed ordering module can order the operations in the change feed by determining, for each entity involved in a given operation starting with the highest entity in the hierarchy, the counter record for the entity, and grouping or sorting all operations based on that counter record. Then for each subdirectory of the highest entity, the change feed ordering module can order the operations for the subdirectory based on the counter record associated with the subdirectory, and so on until the operations on the lowest entity/entities is/are ordered. In one specific example, the change feed ordering module can generate a directed acyclic graph (DAG) having nodes corresponding to each operation, and edges determined based on the set of counter records corresponding to a corresponding one of the multiple file system operations. In this example, the change feed ordering module can traverse the DAG to generate the ordered change feed.

Providing change feed ordering for hierarchical namespaces for a file system can allow for a more accurate representation of the order in which file system operations occur in the file system, which can allow for more accurate replication of the file system, more accurate point-in-time restore of the file system, etc. In addition, providing the change feed ordering, as described herein, may not require perfect time synchronization among namespace services. For example, aspects described herein can allow for distribution of the namespace services throughout the cloud computing platform while still providing a mechanism for appropriately ordering the operations regardless of the system clocks of the nodes providing the namespace services, delay on the nodes, propagation delay between the nodes, etc. Moreover, providing a change feed ordering, as described herein, can allow for minimal impact to writing the change feed (before ordering) so as not to introduce significant latency in the writing operations that frequency occur, while allowing for sorting when needed using the additional counter record data written to the change feed.

Illustrative Environment

FIG. 1 is a diagram showing an example of a cloud computing system 100, in accordance with some aspects of the present disclosure.

As illustrated in FIG. 1, the cloud computing system 100 may include a cloud computing platform 102, and a plurality of client devices 104(1)-(n). The cloud computing platform 102 may provide the client devices 104(1)-(n) with distributed storage and access to software, services, files, and/or data via one or more network(s) 106. The network(s) 106 may include any one or combination of multiple different types of networks, such as cellular networks, wireless networks, local area networks (LANs), wide area networks (WANs), personal area networks (PANs), the Internet, or any other type of network configured to communicate information between computing devices (e.g., the cloud computing platform 102, and the client devices 104(1)-(N)). Some examples of the client devices 104(1)-(n) include computing devices, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc. Further, in some aspects, a client device 104 may include one or more applications configured to interface with the cloud computing platform 102 and/or one or more cloud applications deployed on the cloud computing platform 102. The client devices 104(1)-(n) may be associated with customers (i.e. tenants) of the operator of the cloud computing platform 102 or end-users that are subscribers to services and/or applications of the customers that are hosted on the cloud computing platform 102 and provided by the customers to the end users via the cloud computing platform 102.

As illustrated in FIG. 1, the client devices 104(1)-(*n*) may transmit service requests to one or more services, modules, etc. provided by the cloud computing platform 102, which can include accessing files on the cloud computing platform 102, performing one or more file system operations for files, directories, etc. on the cloud computing platform 102, and/or the like. In an example, cloud computing platform 102 can include multiple file system entities 112(1)-(*m*) that can provide directories in a file system, where each directory may have one or more subdirectories and/or one or more files. In an example, each file system entity 112(1)-(*m*) can have, or can be associated with, a corresponding namespace service module 114(1)-(*m*). Metadata for the file system can be sharded at the directory level, as file system entities 112(1)-(*m*), and spread across physical nodes in the cloud computing platform 102. For example, the sharded metadata can be managed by namespace service modules 114(1)-(*m*) corresponding to each file system entity 112(1)-(*m*).

For example, the directory structure can be organized in a table according to a format similar to the following:

| Account | DirectoryID | Child Name | ChildID |
| --- | --- | --- | --- |
| A1 | ROOT_ID | Foo1 | Foo1_ID |
| A1 | Foo1_ID | Bar1 | Bar1_ID |
| A1 | Bar1_ID | Baz1 | Baz1_ID |
| A1 | Baz1_ID | File1 | File1_ID |
| A1 | Baz1_ID | File2 | File2_ID |

In this example, the directory structure may correspond to a user account (A1), which can be used by one of client devices 104(1)-(*n*), the Directory ID can be a globally unique identifier (GUID) for a parent directory of a child, the child name can be the name of the child directory or file in the parent directory, and the ChildID can be a GUID for the child file or directory. In the example above, File1 can have a namespace of /Foo1/Bar1/Baz1/File1, and File2 can have a namespace of /Foo1/Bar1/Baz1/File2, such that File1 and File2 are files in the parent directory Baz1, which has a parent directory Bar1, which has a parent directory Foo1, which is a child of the root directory (e.g., "/").

As such, operations on a path may touch several file system entities to perform name resolution and find the target directory or file. In this example, name resolution can be an iterative process of resolving location of each entity component (e.g., file or directory) in a path until the final directory is reached. For example, accessing File1 in the example above may traverse the Baz1, Bar1, Foo1, and root directories, or corresponding namespace service modules 114(1)-(*m*), which may be on different computing devices in the cloud computing platform 102. Each namespace service module 114(1)-(*m*) can manage changes made to its corresponding file system entities 112(1)-(*m*), which may include logging changes in one or more change tables 116(1)-(*p*). According to aspects described herein, a namespace service module 114(1)-(*m*) can, for a corresponding file system operation to be performed on a given file system entity 112(1)-(*m*), obtain information from one or more parent file system entities for including in the change table(s) 116(1)-(*p*), which can assist in ordering the file system operations.

In some aspects, a cloud computing platform 102 can include a change feed module that obtains a list of change operations performed on the file system, such as file or directory creation, deletion, modification, etc., where modification can include modifying properties of the file or directory, such as name, access permissions, and/or the like. As described, the changes may be stored in the change table 116(1)-(*p*) in an order as received from the namespace service modules 114(1)-(*m*), which may be different than the order the changes where actually performed. In addition, as described, the changes may have additional information to assist in determining an order for the changes, and a change feed ordering module 120 can order the changes based on the additional information for outputting an ordered change feed 122. One or more nodes of the cloud computing platform 102, or other devices, may use the ordered list to perform operations based on the file system operations, such as replication of the file system, point-in-time restore, etc.

In one example, change feed ordering module 120 can operate and/or be called for operations in the cloud computing platform 102 to generate and provide the ordered change feed 122 (e.g., to one or more client devices 104(1)-(*n*)). In another example, one or more client devices 104(1)-(*n*) can execute the change feed ordering module 120 as an application to locally generate the ordered change feed 122 from a change feed obtained from the change feed module 118 via cloud computing platform 102.

Figure 2:
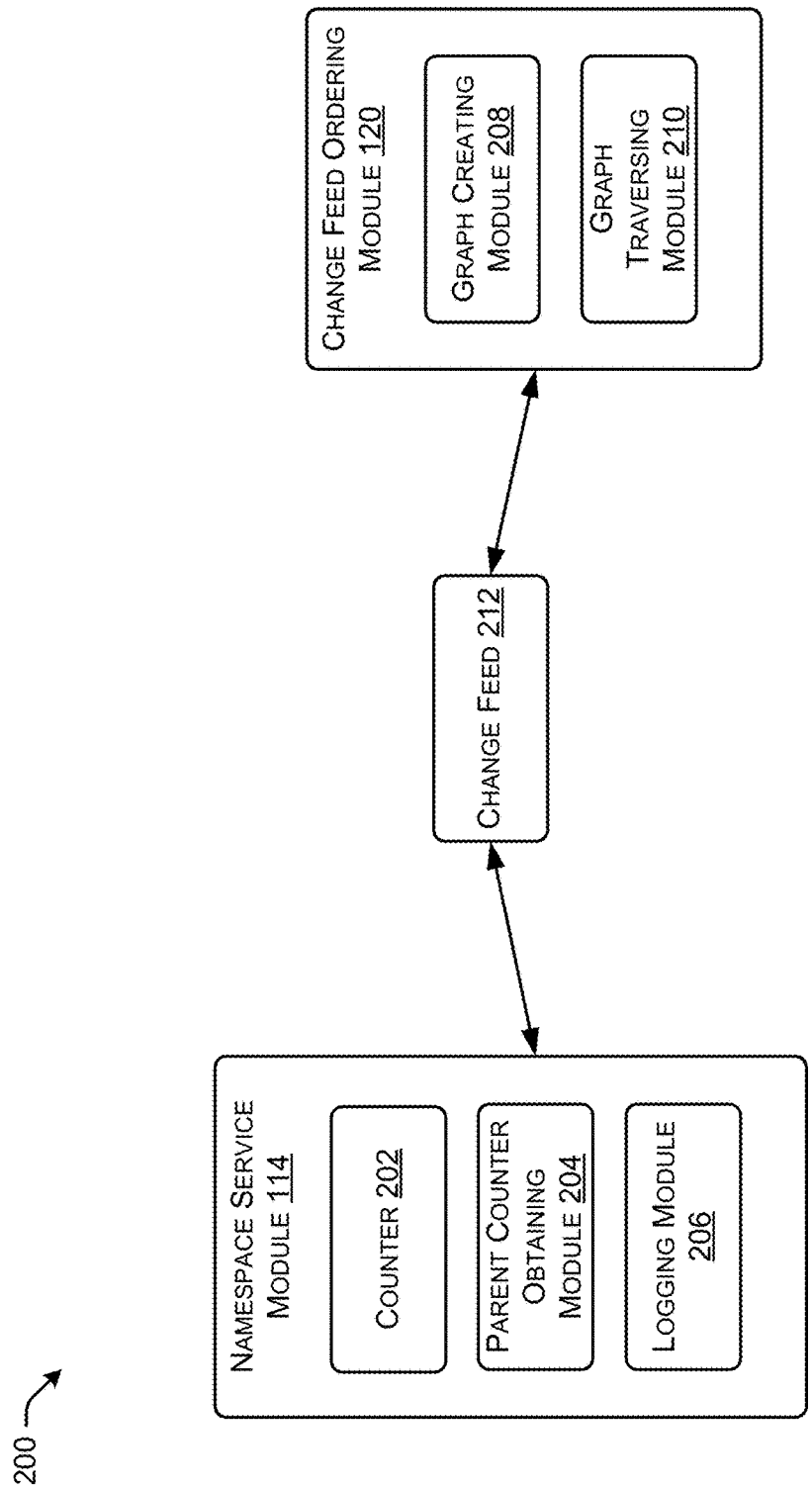
FIG. 2 is a diagram showing an example of a namespace service module and change feed ordering module, in accordance with some aspects of the present disclosure.

FIG. 2 is a diagram showing an example of a system 200 that may be utilized in a cloud computing platform for ordering operations on a file system having a hierarchical namespace, in accordance with some aspects of the present disclosure.

System 200 can include at least one namespace service module 114 that can log changes to, or other operations on, an entity in a file system having a hierarchical namespace in a change feed 212 (which may be generate from at least one change table 116 via a change feed module 118, in one example). System 200 can also include a change feed ordering module 120 that can order the changes in the change feed 212. In an example, namespace service module 114 can include a counter 202 that may monotonically increase overtime and/or per operation performed on or via namespace service module 114, a parent counter obtaining module 204 for obtaining a counter record for a parent entity related to a given operation, and/or a logging module 206 for logging a file system operation including logging an indication of the file system operation, a counter record of counter 202 for the operation, and one or more counter records of one or more parent entities obtained by parent counter obtaining module 204. In an example, change feed ordering module 120 can include a graph creating module 208 for creating a DAG representing changes in the change feed 212 having nodes corresponding to operations performed for or via one or more namespace service modules and edges having a direction determined based on the set of counter records corresponding to the file system operation, and/or a graph traversing module 210 for traversing the DAG to generate an ordered change feed.

In one example, each entity (e.g., file or directory) managed by a namespace service module can have a counter, such as counter 202. The counter, as described, can include a monotonically increasing counter, such as a vector clock or a system clock, and can be per entity, which can be later used to determine order of operations on the entity. In this example, at least for each metadata operation on an entity, namespace service module 114 can get a new counter record value from counter 202. In addition, if the entity has a parent entity, parent counter obtaining module 204 can obtain the last counter record used for an operation on the parent entity, and/or can obtain each last counter record used for operations on each of the parent entities, where the entity has multiple parent entities (e.g., where the direct parent entity of the entity has a parent entity, and so on until the root directory block is reached). In this example, logging module 206 can log the operation along with the various counter records to allow for later determining an ordering for the operations on the file system, as described above and further herein.

In the example described above, for an operation on File1 (e.g., at least a metadata operation that may change properties of File1), a namespace service module 114 for File1 can generate a new counter record value from counter 202, and parent counter obtaining module 204 can obtain a last used counter record value for baz1, bar1, foo1, and the root directory. Logging module 206 can log an indication of the change to File1 in change table 116 along with the new counter record value from counter 202 and the last used counter record values for baz1, bar1, foo1, and the root directory. This can allow change feed ordering module 120 to order the operation within a collection of operations in change table 116 or resulting change feed (e.g., other modifications to File1, or of baz1, bar1, foo1, the root directory, or child entities thereof), as described above and further herein.

In examples described herein, a namespace service module 114 can keep track of file/directory changes with help of logical monotonically increasing counters, which may include a monotonically incrementing counter on every entity (e.g., file or directory). Every meta-data operation on an entity can increment entity counter and obtain a clock to assign an event sequencer. This helps determine causal ordering on operations happening on an entity. This clock can also be, for a given entity (e.g., file or director) be durably persisted across namespace service modules 114 for that entity for crash recovery concerns. For example, for operations on an entity "/," counter 202 can start with a value of "1" in the following list of changes: Create "/": 1; Set ACL "/": 2; Set ACL "/": 3; Set ACL "/": 4; Set ACL "/": 5; Delete "/": 6. Set ACL may refer to setting access control list (ACL) for the entity to specify which user accounts have which type of access to the entity (e.g., read, write, etc.). In some examples, a monotonically increasing system clock can be used as the counter 202, so long as the system clock is not automatically adjusted during operation of the namespace service module 114. This can provide per-entity ordering and can capture the dependency between events that happen in order to make sure causality is not violated. In one example, vector clocks can be used as the counter 202 as well.

In the examples described herein, a logical clock can be maintained for each entity. In an example, each operation can keep track of logical clocks of all entities that are visited before it executes the operation on target entity. For example, Create /a/b/c/d can visit entity '/', 'a', b', 'c' before creating 'd', and capture clock values. This creates a dependency of 'd' on its parent and all ancestors. If another operation happens after the previous one, say Create /a/b/c/d/e, then it can similarly visit '/', 'a', b', 'c', and 'd' thus establishing causal dependency between this and previous event with help of clock values captured.

Figure 3:
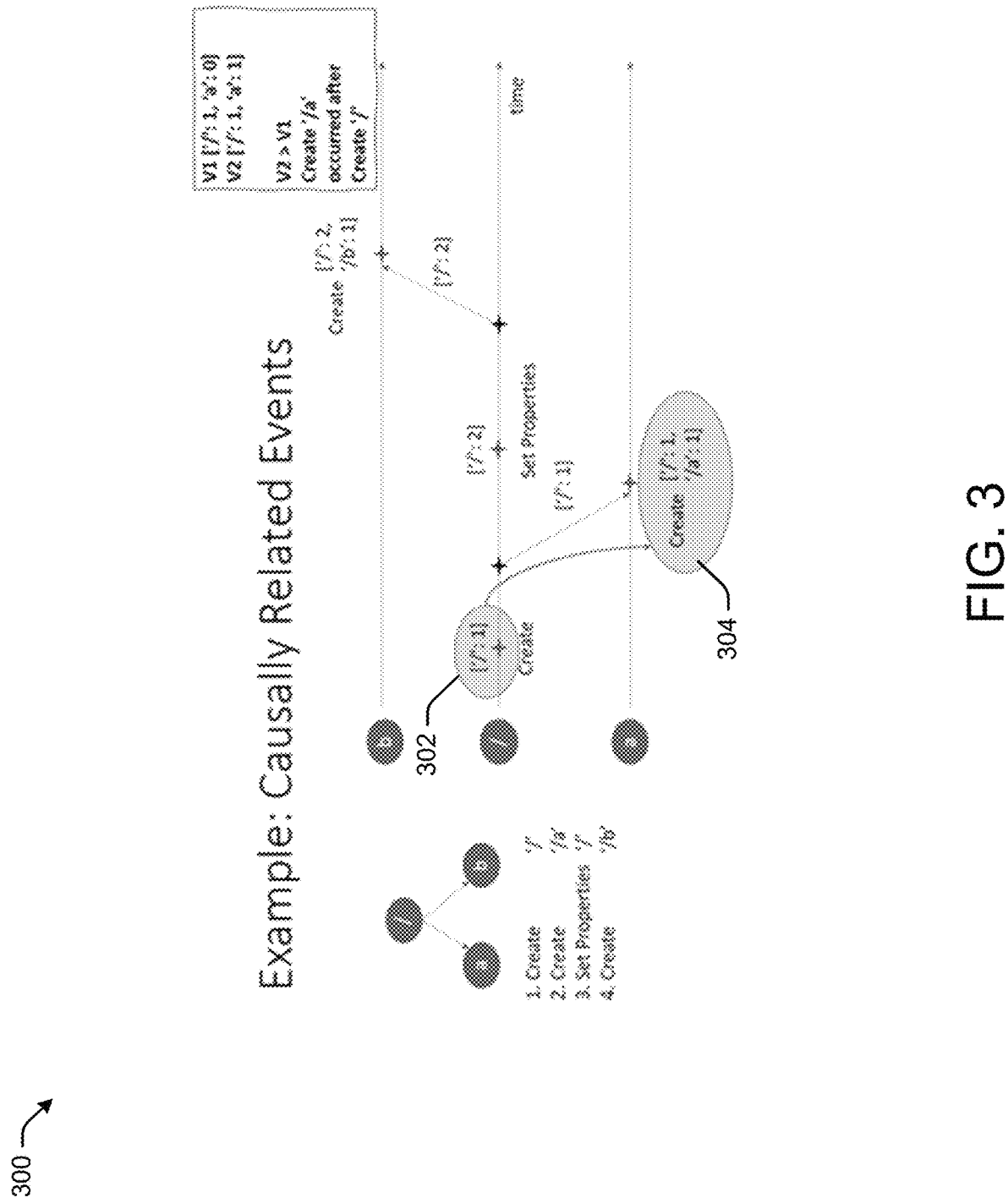
FIG. 3 illustrates an example of a timeline of causally related events, in accordance with some aspects of the present disclosure.

FIG. 3 illustrates an example of a timeline 300 of causally related events for which order can matter in obtaining a change feed of the events. In timeline 300, "/" is created at 302 before "/a" is created at 304. Because "/a" is a subdirectory of "/," the creation of "/a" at 304 can be causally dependent on the creation of "/" at 302, although both events may occur by different namespace service modules 114. Thus, ordering of the events at 302 and 304 can be preserved in the ordered change feed.

Figure 4:
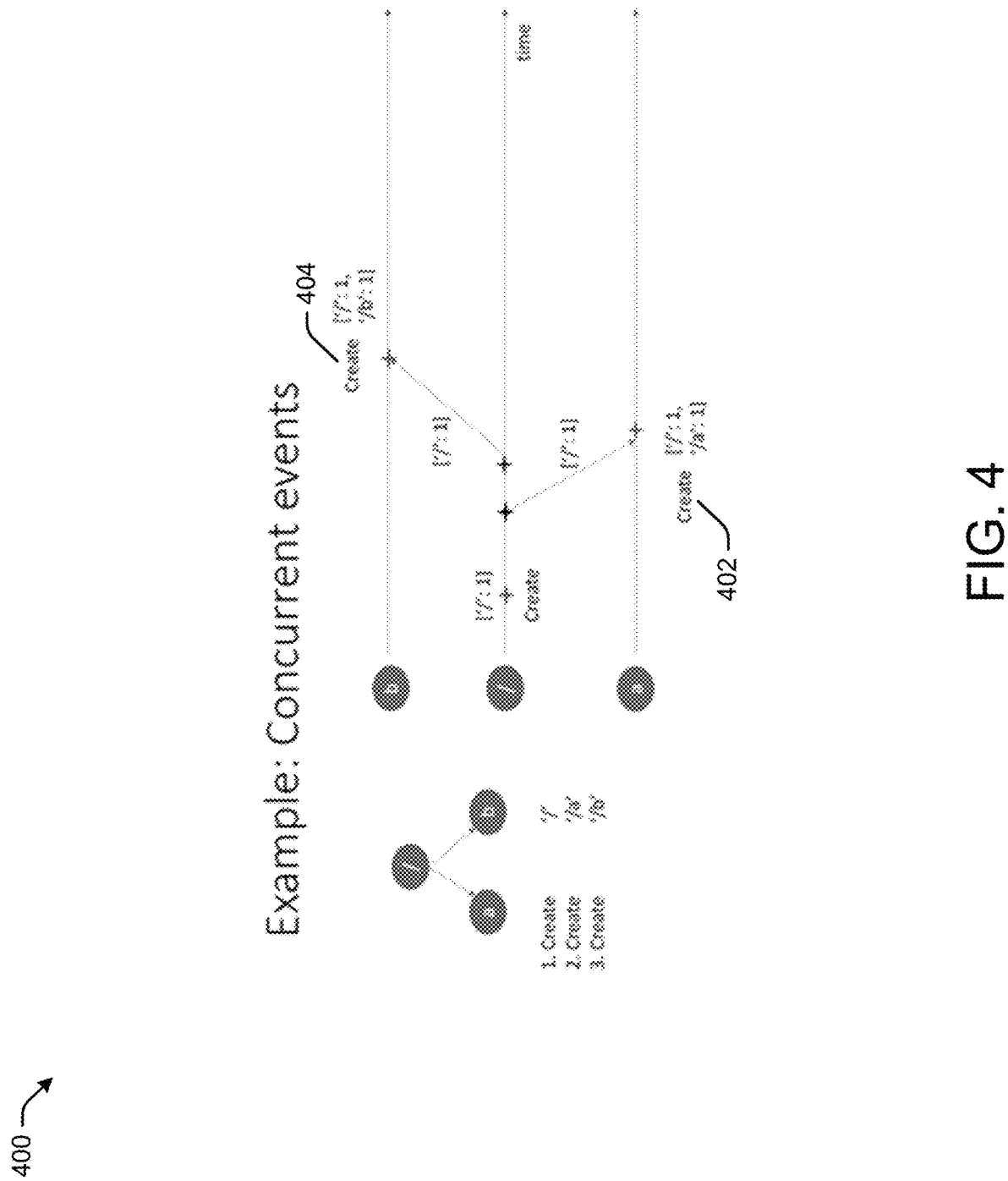
FIG. 4 illustrates an example of a timeline of concurrent events, in accordance with some aspects of the present disclosure.

FIG. 4 illustrates an example of a timeline 400 of concurrent events that are not dependent on one another, and as such order may not matter in obtaining a change feed of the events. In timeline 400, "/a" is created at 402 before "/b" is created at 404. Though both events have the same parent entity "/," the events 402 and 404 are not dependent on one another and can occur concurrently. Thus, ordering of the events 402 and 404 may not need to be preserved in the ordered change feed.

One purpose of an ordered change feed can be to provide transaction logs of all the changes that occur to blobs (e.g., files) and directories in a hierarchical namespace (HNS) enabled storage account. The change feed can provide the ordered, guaranteed, durable, immutable, read-only log of these changes, in one example. For example, client applications can read these logs at any time, either in streaming or in batch mode. The change feed enables customers to build efficient and scalable solutions that process change events that occur in the storage account at a low cost. In a specific non-limiting example, the change feed can be stored as blobs in a special container in a user's storage account at standard blob pricing cost, and users can control the retention period of these files based on their requirements. In this example, change events can be appended to the change feed as records in a compact, fast, binary format that provides rich data structures with inline schema.

In some examples, as described herein, for providing change feeds to applications (e.g., applications executing on client devices 104(1)-(n), change feed module 118 can provide the original change feed from change table(s) 116(1)-(p) before ordering (which may have the additional counter record data), to maintain backward compatibility with legacy applications, and/or change feed ordering module 120 can provide the ordered changed feed 122 to offer the additional functionality of ordered change feeds. In addition, for example, change feed module 118 can write the change feed at account level, e.g., capturing all events from all containers appear in a single feed in a container for a user account. Some applications, however, can benefit from a reliable and consistent way to consume the change feed to build indexes, replication, or other applications, which need ordered feed across files/directories (causally related entities). To make this happen, as described above and further herein, namespace service modules 114 can add additional information to the existing change feed events, to represent the causal relationships, in a new field (e.g., "ordering sequencer") on the event schema, but also keeping rest of the pipeline for unordered change feed generation and consumption like that of a conventional change feed. In this example, a post processing library or a component, which can be run on or by the consumer (e.g., change feed ordering module 120), can process the above change feed and generate another new change feed which has the required causal ordering of events across the entire account. The ordered change feed can be written back to a new container of choice in the user account.

Example Processes

The processes described in FIGS. 5-6 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the namespace service modules 114, change feed module 118, change feed ordering module 120, etc. By way of example and not limitation, the methods 500 and 600 are described in the context of FIGS. 1 and 2. For example, the operations may be performed by one or more of the namespace service modules 114, change feed module 118, change feed ordering module 120, etc.

Figure 5:
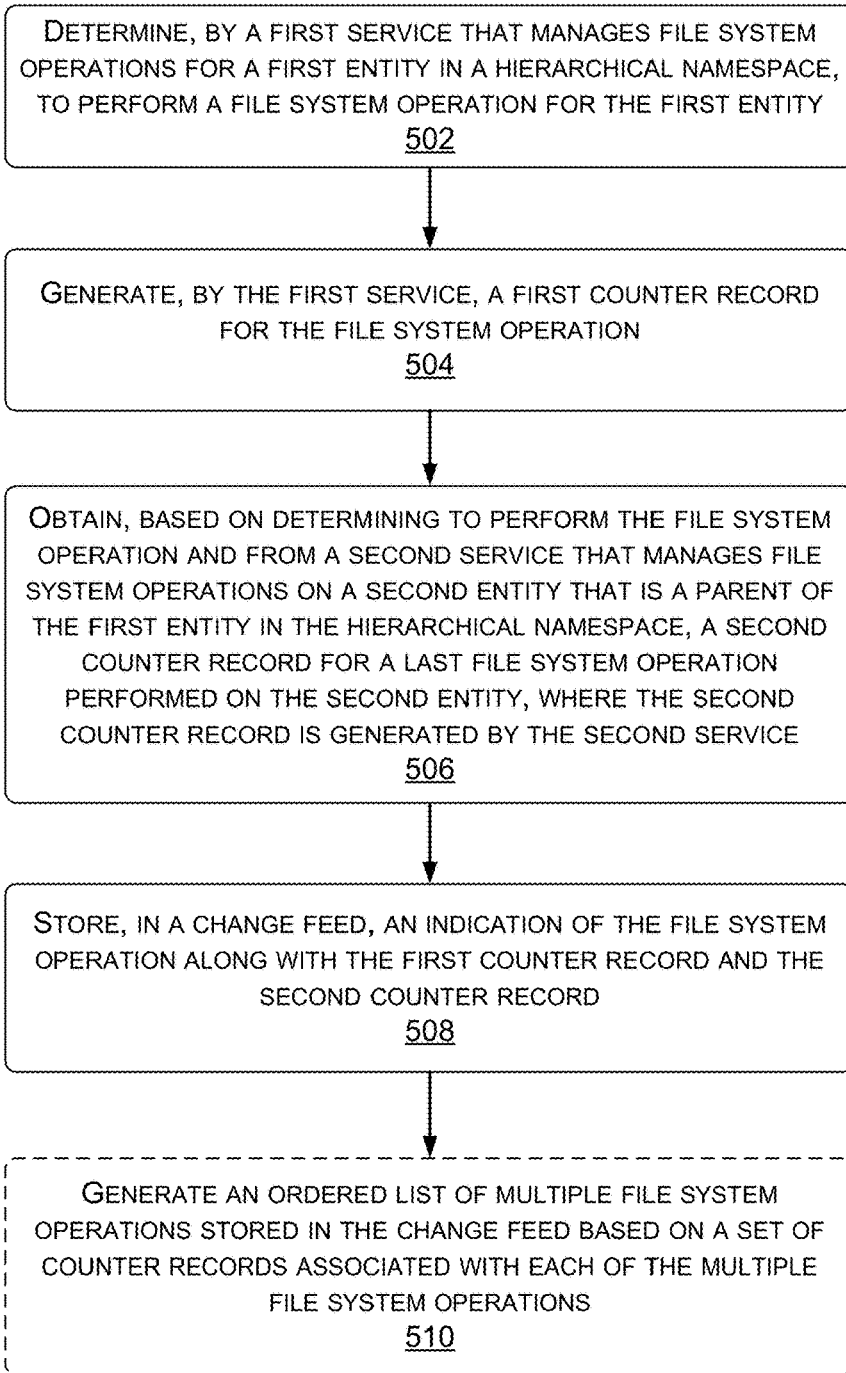
FIG. 5 is a flow diagram illustrating an example of a method for storing a change feed with counter record information, in accordance with some aspects of the present disclosure.

FIG. 5 is a flow diagram illustrating an example of a method 500 for storing namespace changes with counter record information, in accordance with some aspects of the present disclosure.

At block 502, the method 500 may include determining, by a first service that manages file system operations for a first entity in a hierarchical namespace, to perform a file system operation for the first entity. For example, a namespace service module 114, which can be the first service that manages file system operations for the first entity, e.g., in conjunction with a processor 902, memory 904, cloud computing device 900, cloud computing platform 102, etc., can determine to perform the file system operation for the first entity. For example, the first entity can include an entity of the file system, such as a directory or file, as described above. In addition, for example, the file system operation can include an operation that modifies metadata for the entity, such as entity creation, modification of an entity name or ACL properties, deletion of the entity, etc. In an example, namespace service module 114 can determine to perform file system operations on entities based on commands or requests received from client devices 104(1)-(n) executing file system management applications. In one example, a given application may also be related to a specific user account for which file system operations can be stored.

At block 504, the method 500 may include generating, by the first service, a first counter record for the file system operation. For example, namespace service module 114, e.g., in conjunction with a processor 902, memory 904, cloud computing device 900, cloud computing platform 102, etc., can generate the first counter record for the file system operation. For example, namespace service module 114 can generate the first counter record as a monotonically increasing counter value per file system operation performed by the namespace service module 114 (e.g., using counter 202). As described, the counter record can include a value from a vector clock, a system clock that does not automatically update during operation of the namespace service module 114, an atomic counter, etc., so long as a sequence can be provided for the file system operations performed using a given namespace service module 114.

At block 506, the method 500 may include obtaining, based on determining to perform the file system operation and from a second service that manages file system operations on a second entity that is a parent of the first entity in the hierarchical namespace, a second counter record for a last file system operation performed on the second entity, where the second counter record is generated by the second service. For example, parent counter obtaining module 204, e.g., in conjunction with a processor 902, memory 904, cloud computing device 900, cloud computing platform 102, namespace service module 114, etc., can obtain, based on determining to perform the file system operation and from a second service (e.g., another one of namespace service modules 114(1)-(m)) that manages file system operations on a second entity that is a parent of the first entity in the hierarchical namespace, a second counter record for a last file system operation performed on the second entity, where the second counter record is generated by the second service. For example, as described, parent counter obtaining module 204 can access at least one (or all) parent entities of the first entity to obtain respective counter records of last operations performed on those entities to maintain the causality relationship between operations. For example, where the first entity is "/a," in the example described above, the second entity can be "/" and parent counter obtaining module 204 can obtain the last counter record value from the namespace service for "/" to include in the change feed for later sorting.

At block 508, the method 500 may include storing, in a change feed, an indication of the file system operation along with the first counter record and the second counter record. For example, logging module 206, e.g., in conjunction with a processor 902, memory 904, cloud computing device 900, cloud computing platform 102, namespace service module 114, etc., can store, in the change feed (e.g., change feed 212 or in change feed tables 116(1)-(p) for including in a change feed 212, etc.), the indication of the file system operation along with the first counter record and the second counter record. In addition, for example, parent counter obtaining module 204 may obtain, and logging module 206 may store, additional counter records for other parent entities as well (e.g., counter records for each entity from the first entity to the root directory).

At block 510, the method 500 may optionally include generating an ordered list of multiple file system operations stored in the change feed based on a set of counter records associated with each of the multiple file system operations. For example, change feed ordering module 120, e.g., in conjunction with a processor 902, memory 904, cloud computing device 900, cloud computing platform 102, etc., can generate the ordered list of multiple file system operations in the change feed (e.g., stored for the user account) based on the set of counter records associated with each of the multiple file system operations. For example, change feed ordering module 120 can determine an order of change feed operations based on the counter record values, such as by associating all records having a highest entity counter record of the same value and sorting on the next entity counter record value, as described in further detail herein.

In examples described herein, when a file system operation is executed for a given namespace (e.g., and associated with or via a namespace service module), the request can perform full path name resolution to resolve all the path components which may be present across multiple physical instances. Once the full path has been resolved, and the target entity's location is found, then the file system e.g., via a resource manager or other process, can execute the given operation on the target entity.

Each entity in a namespace can maintains, or namespace service module can maintain for each entity, its own version counter that tracks modifications with respect to the entity. This is can be obtained from a monotonically increasing system clock on that namespace instance. With the help of this clock, all change events that happened on a given entity can be ordered in the correct order of its modifications.

Whereas, to capture causal dependency with this entity's parent and ancestor entities, all their corresponding current version counters can be captured as part of this operation as well and used in constructing dependencies during the final event sorting process. To achieve this, all current ancestor version counters can be captured as part of request information, while performing name resolution of the request, and finally appended along with the target entity's commit version counter, as a list of versions/clocks (e.g., vector clocks).

In one example, using a vector clock can allow for capturing additional information of the entity, such as version in the provided path locator (e.g., universal resource locator (URL)), starting with account, then container, and K levels of directories/files. The minimum size of vector clock can be at least 2 values, as account and container are existing in the URL.

Some optimizations are possible to reduce the size overhead of the vector clock, such as performing a variable length differential encoding of the clocks in the vector. This can allow for recording one full clock value, and the rest as offsets from the first clock value. In another example, the account clock may need not be captured as sorting is done at account-level and there may be no cross-account dependencies.

The events stored in the change feed by the namespace service modules 114(1)-(m) are only ordered at per-entity but not across entities as described. In a specific non-limiting example, this change feed can be broken down into several non-overlapping segments based on wall-clock time, called Time Windows. Each of the Time Windows can have one or more log files, each of which contains change events that occurred in the given period as defined by the Time Window. Time windows can be also partitioned internally corresponding to entity (e.g., file or directory) name to allow consumers to process events of a Time Window in parallel if needed. In an example, change feed ordering module 120 can order a change feed for a given Time Window.

FIG. 6 is a flow diagram illustrating an example of a method 600 for ordering a change feed based on counter record information, in accordance with some aspects of the present disclosure.

At block 602, the method 600 may include obtaining a change feed including a list for multiple file system operations performed in a file system on various nodes, where the list includes, for each file system operation, a set of counter records each associated with an entity involved in the file system operation. For example, change feed ordering module 120, e.g., in conjunction with a processor 902, memory 904, cloud computing device 900, cloud computing platform 102, etc., can obtain the change feed including the list for multiple file system operations performed in a file system on various nodes, where the list includes, for each file system operation, a set of counter records each associated with an entity involved in the file system operation. For example, the change feed can include a change feed 212 obtained from a change feed module 118, such as a change feed stored at block 508 in method 500. In this regard, for example, the set of counter records can include counter record values for the entity involved in the file system operation and one or more of its parent entities (e.g., each entity between the entity involved and the root directory).

At block 604, the method 600 may include generating an ordered list of multiple file system operations stored in the change feed based on a set of counter records associated with each of the multiple file system operations. For example, change feed ordering module 120, e.g., in conjunction with a processor 902, memory 904, cloud computing device 900, cloud computing platform 102, etc., can generate the ordered list of multiple file system operations (e.g., ordered change feed 122) stored in the change feed (e.g., change feed 212 or associated change tables 116(1)-(p)) based on the set of counter records associated with each of the multiple file system operations. For example, change feed ordering module 120 can determine an ordering of file system operations by associating file system operations having a same counter record for a highest entity (e.g., the root directory), sorting the associated file system operations, and continuing down each level of entity until sorting has occurred on the lowest entity in the file system operations. In one example, this can be accomplished using a DAG, as described in further detail herein. As the change feed can be unbounded, a mechanism to perform the sorting in incremental fashion can be selected.

In an example, generating the ordered list at block 604, can optionally include at block 606, creating a DAG having nodes corresponding to each of the multiple file system operations and edges between the nodes having a direction determined based on the set of counter records corresponding to a corresponding one of the multiple file system operations. For example, graph creating module 208, e.g., in conjunction with a processor 902, memory 904, cloud computing device 900, cloud computing platform 102, change feed ordering module 120, etc., can create a DAG having nodes correspond to each of the multiple file system operations and edges between the nodes having a direction determined based on the set of counter records corresponding to a corresponding one of the multiple file system operations. For example, graph creating module 208 can generate an edge from a first node to a second where a file system operation of the first node is determined to have a dependency to a file system operation of the second node.

Once change feed ordering module 120 obtains and loads the events in the change feed into memory, graph creating module 208 can determine the causal dependencies between them, which may include, in a specific example, using a helper data structure referred to herein as "Entity Dependencies Map." This map can store for each entity, its versions and the corresponding event that created this version (creator event) and corresponding set of events which have observed that version (observer events) while performing their respective operations. For example, the data structure can have a format similar to the following: Map<EntityPath, Map<EntityVersion, Pair<EventID, Set<EventID>>>, where EntityPath is a String, EntityVersion is an integer, and EventID is a unique identifier. For each event "e" in the list of events 'E', graph creating module 208 can Insert an entry for the entity modified in this event, m, with a modification version "m-v", and put "e" as the creator event in the map for this {m, m-v} map entry. For each of the observed entity version pairs "o, o-v" in the event, graph creating module 208 can insert an entity and version pair {o, o-v} (if not exists) and put "e" in the set of observer events.

For example, with two operations serialized in the order, Create "/a" (e1), and Create "/a/b" (e2), the Create "/a/b" has observed version 1 of "/" and version 1 of "a", while name resolving the path "/a/b" (assuming "/" current version is 1, and "a" current version is 1 while Create "/a/b" is being performed). So, the Entity Dependencies Map can be:

| E1: Create /a | ['/': 1, '/a': 1] |
| E2: Create /a/b | ['/': 1, '/a': 1, '/a/b': 1] |

| Entity Path | Entity Version | Creator Event | Observer Events |
|---|---|---|---|
| / | 1 | — | E1, E2 |
| /a | 1 | E1 | E2 |
| /a/b | 1 | E2 | — |

Similarly, if the subsequent events are Set Properties "/" (e3), and Create "/a/b/c" (e4), and Create 7a/b/c/d" (e5) then the Event Dependencies Map can be:

| E3: Set Properties '/' | ['/': 2] |
| E4: Create '/a/b/c' | ['/': 2, '/a': 1, '/a/b': 1, '/a/b/c': 1] |
| E5: Create '/a/b/c/d' | ['/': 2, '/a': 1, '/a/b': 1, '/a/b/c': 1, '/a/b/c/d': 1] |

| Entity Path | Entity Version | Creator Event | Observer Events |
|---|---|---|---|
| / | 1 | — | E1, E2 |
| | 2 | E3 | E4, E5 |
| /a | 1 | E1 | E2, E4, E5 |
| /a/b | 1 | E2 | E4, E5 |
| /a/b/c | 1 | E4 | E5 |
| /a/b/c/d | 1 | E5 | — |

Performing a rename operation can change the Map as follows:

| E6: Rename '/a/b/c' -> '/a/d' | ['/': 2, '/a': 1, '/a/b': 1, '/a/b/c': 2], ['/': 2, '/a': 1, '/a/d': 1] |

| Entity Path | Entity Version | Creator Event | Observer Events |
|---|---|---|---|
| / | 1 | — | E1, E2 |
| | 2 | E3 | E4, E5, E6 |
| /a | 1 | E1 | E2, E4, E5, E6 |
| /a/b | 1 | E2 | E4, E5, E6 |
| /a/b/c | 1 | E4 | E5 |
| | 2 | E6 | — |
| /a/b/c/d | 1 | E5 | — |
| | 1 | E6 | — |
| /a/d | 1 | E6 | — |

In the above Event Dependencies Map data structure, the first key can represent entities with their full paths as unique identifiers, and the value is another map with version number as key. For each version number as the key, its value can be a pair, which captures a set of all the event IDs that have observed this entity version and a specific event which created the entity version. Note that for '/' and version '1' there may be no creator event in this set of events, which can happen when processing a set of events that may not capture all events since the inception of the corresponding user account.

In using the Event Dependencies Map, causal dependencies can be identified. For example, graph creating module 208 can construct a DAG with nodes representing events E1-E6 and edges between the nodes representing causal dependencies. If there is no causal dependency between two events, then the edge is not satisfied. There can be two types of directed edges: a strong edge; or a weak edge. A strong edge can capture strict causality between an event which introduced an entity version and all events that have seen this entity version, which can be typical of parent-child entity causal relationships. For example:

| Entity Path | Entity Version | Creator Event | Observer Events |
|---|---|---|---|
| /a | 1 | E1 | E2, E4, E5, E6 |

In the above Entity Dependency Map entry, E1→E2, E1→E4, E1→E5, E1→E6 are all strong edges A weak edge can capture pseudo causality between an event which introduced an entity version and all events that have created or observed the previous version of the same entity. For example:

| Entity Path | Entity Version | Creator Event | Observer Events |
|---|---|---|---|
| / | 1 | — | E1, E2 |
| | 2 | E3 | E4, E5, E6 |

In the above Entity Dependency Map entry, E1→E3, E2→E3 are weak edges since E1 and E2, are not guaranteed to occur before E3 corresponding to their wall clock times.

In an example, graph creating module 208 can, for each event "€" in set of events "E": let the entity modified in this event be "e", and version generated be 'v'; lookup the Entity Dependencies Map for the dependent events of this "e" and "v" and call this result set of events as "Cur-Observers"; For each event "j" in "Cur-Observers" add an edge between "€" and "j" which can be a strong edge; if there is a previous version for "e" in the Entity Dependencies Map—e.g., the immediately previous version to version "v"—let the previous version's creator event be "Prev-Creator"; let the previous version's observer events be "Prev-Observers"; add an edge between "Prev-Creator" and "€" which can be a weak edge; for each event "k" in "Prev-Observers" add an edge between 'k' and € which can be a weak edge.

Figure 7:
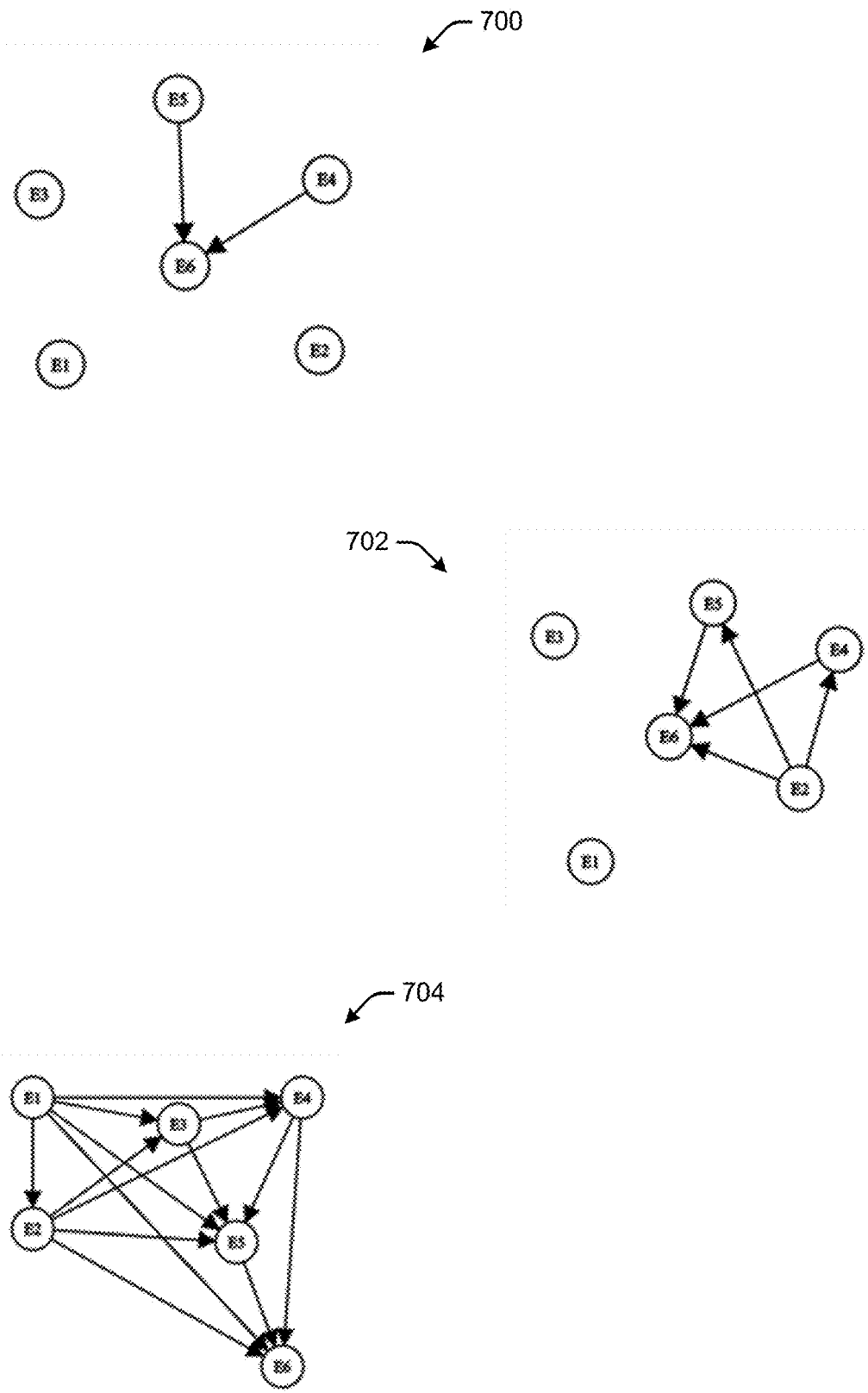
FIG. 7 illustrates various states of a directed acyclic graph (DAG) generated for sorting a change feed, in accordance with some aspects of the present disclosure.

In a specific example, given the example for events E1-E6 above, graph creating module 208 may randomly shuffle the events, and execute the above operations. For example, for a change feed sequence of:

| E6: Rename '/a/b/c' -> '/a/d' | ['/': 2, '/a': 1, '/a/b': 1, '/a/b/c': 2], ['/': 2, '/a': 1, '/a/d': 1] |
| E2: Create '/a/b' | ['/': 1, '/a': 1, '/a/b': 1] |
| E4: Create '/a/b/c' | ['/': 2, '/a': 1, '/a/b': 1, '/a/b/c': 1] |
| E3: Set Properties '/' | ['/': 2] |
| E5: Create '/a/b/c/d' | ['/': 2, '/a': 1, '/a/b': 1, '/a/b/c': 1, '/a/b/c/d': 1] |
| E1: Create '/a' | ['/': 1, '/a': 1] | graph creating module 208 can construct an event graph from the above shuffled list of events, step-by-step using the operations described above to generate a graph having edges E1, E2, E3, E4, E5, E6. In this example, after processing the event:

| E6: Rename '/a/b/c' -> '/a/d' | ['/': 2, '/a': 1, '/a/b': 1, '/a/b/c': 2], ['/': 2, '/a': 1 , '/a/d': 1] | graph creating module 208 can add an edge from E4→E6 and E5→E6, as shown in FIG. 7 at 700. After processing event E2:

| E2: Create '/a/b' | ['/': 1, '/a': 1, '/a/b': 1] | graph creating module 208 can add an edge from E2→E4, E2→E5, and E2→E6, as shown in FIG. 7 at 702 and so on until final graph 704 is generated after processing all events in the change feed.

In an example, generating the ordered list at block 604, can optionally include at block 608, performing a graph traversal of the DAG to generate the ordered list of multiple file system operations. For example, graph traversing module 210, e.g., in conjunction with a processor 902, memory 904, cloud computing device 900, cloud computing platform 102, change feed ordering module 120, etc., can perform the graph traversal of the DAG to generate the ordered list of multiple file system operations. In this regard, for example, visiting the final graph 704 in a depth-first search (DFS) fashion and obtaining a topological order can result in a sequence of events which is causally ordered with respect to their corresponding counter record information (e.g., vector clock or otherwise). Topological sorting of the graph in the running example can give us the final sorted order of events E1, E2, E3, E4, E5, E6.

In the example described above, once the topological sorting is completed, change feed ordering module 120 can write the events to the ordered change feed 122 in the topological order. Inside a given time window, partitioning may be absent e.g., all events can be written into a shards (or partitions). For example, considering the following set of events in a single window:

| E1: Create '/a/b1' => [ | '/': 1, '/a': 1, '/a/b1': 1] |
| E2: Create '/a/b2' => [ | '/': 1, '/a': 1, '/a/b2': 2] |
| E3: Create '/a/b1/c1' => [ | '/': 1, '/a': 1, '/a/b1': 1, '/a/b1/c1': 1] |
| E4: Create '/a/b1/c2' => [ | '/': 1, '/a': 1, '/a/b1': 1, '/a/b1/c2': 2] |
| E5: Create '/a/b2/d1' => [ | '/': 1, '/a': 1, '/a/b2': 2, '/a/b2/d1': 1] |
| E6: Create '/a/b2/d2' => [ | '/': 1, '/a': 1, '/a/b2': 2, '/a/b2/d2': 2] |
| E7: Create '/a/b3' => [ | '/': 1, '/a': 1, '/a/b3': 3] |
| E8: Create '/a/b3/e1' => [ | '/': 1, '/a': 1, '/a/b3': 3, '/a/b3/e1': 4] |
| E9: Create '/a/b3/e2' => [ | '/': 1, '/a': 1, '/a/b3': 3, '/a/b3/e2': 5] |
| E10: Create '/a/b4' => [ | '/': 1, '/a': 1, '/a/b4': 4] |

The Entity Dependencies Map can be as follows:

| Entity Path | Entity Version | Creator Event | Observer Events |
|---|---|---|---|
| /a/b1/c2 | 2 | E4 | — |
| /a/b1 | 1 | E1 | E3, E4 |
| /a/b2/d1 | 1 | E5 | — |
| /a/b1/c1 | 1 | E3 | — |
| /a/b2 | 2 | E2 | E5, E6 |
| /a/b2/d2 | 2 | E6 | — |
| /a/b3 | 3 | E7 | E8, E9 |
| /a/b3/e1 | 4 | E8 | — |
| /a/b3/e2 | 5 | E9 | — |
| /a/b4 | 4 | E10 | — |

In an example, graph traversing module 210 can create the resulting final graph as partitioned into 4 distinct shards with each shard containing Vertices (Events) that only depend on Events within its shard and no other shard, as shown in FIG. 8 at 800, having:
Shard 1: E1, E3, E4
Shard 2: E2, E5, E6
Shard 3: E7, E8, E9
Shard 4: E10

As each shard can be independently consumed, this can offer a degree of parallelism to the consuming subsystems that can sort the change feed. In addition, for example, rename operations may cause shards to merge. In the example above, assuming a new event:

| E11 : Rename '/a/b1c2' -> '/a/b2/d3' ['/': 1, '/a': 1, '/a/b1': 1, '/a/b1/c2': 4], ['/': 1, '/a': 1, /a/b2': 2, '/a/b2/d3': 4] | may result in the merging of Shards 1 and 2 above, as both E1 and E2 can have an edge linking them to E11, as an observer event, as shown in FIG. 8 at 802. In an example, in this regard, graph traversing module 210 can partition the final graph by identifying the weak edges (e.g., the weakly connected components). Weakly connected components for a DAG can reduce to finding connected components in an undirected graph, which can be based on DFS-based topological sort.

At block 610, the method 600 may include outputting the ordered list of multiple file system operations. For example, change feed ordering module 120, e.g., in conjunction with a processor 902, memory 904, cloud computing device 900, cloud computing platform 102, etc., can output the ordered list of multiple file system operations, e.g., as ordered change feed 122, as described above, to a separate log or container, as output to a function called on the change feed ordering module 120, etc.

At block 612, the method 600 may optionally include executing the multiple file system operations from the ordered list on a redundant file system. For example, one or more applications executing on a client device 104(1)-(n) can execute the multiple file system operations from the ordered list on a redundant file system. As described, performing the file system operations in order can allow the one or more applications to create a more accurate replication of the file system.

At block 614, the method 600 may optionally include utilizing the ordered list to provide a point-in-time restore of the file system. For example, one or more applications executing on a client device 104(1)-(n) can utilize the ordered list to provide a point-in-time restore of the file system. For example, the one or more applications can perform the operations in the ordered list from a starting point to the point-in-time, or can reverse the instructions from a current time to the point-in-time, etc.

Illustrative Computing Device

Figure 9:
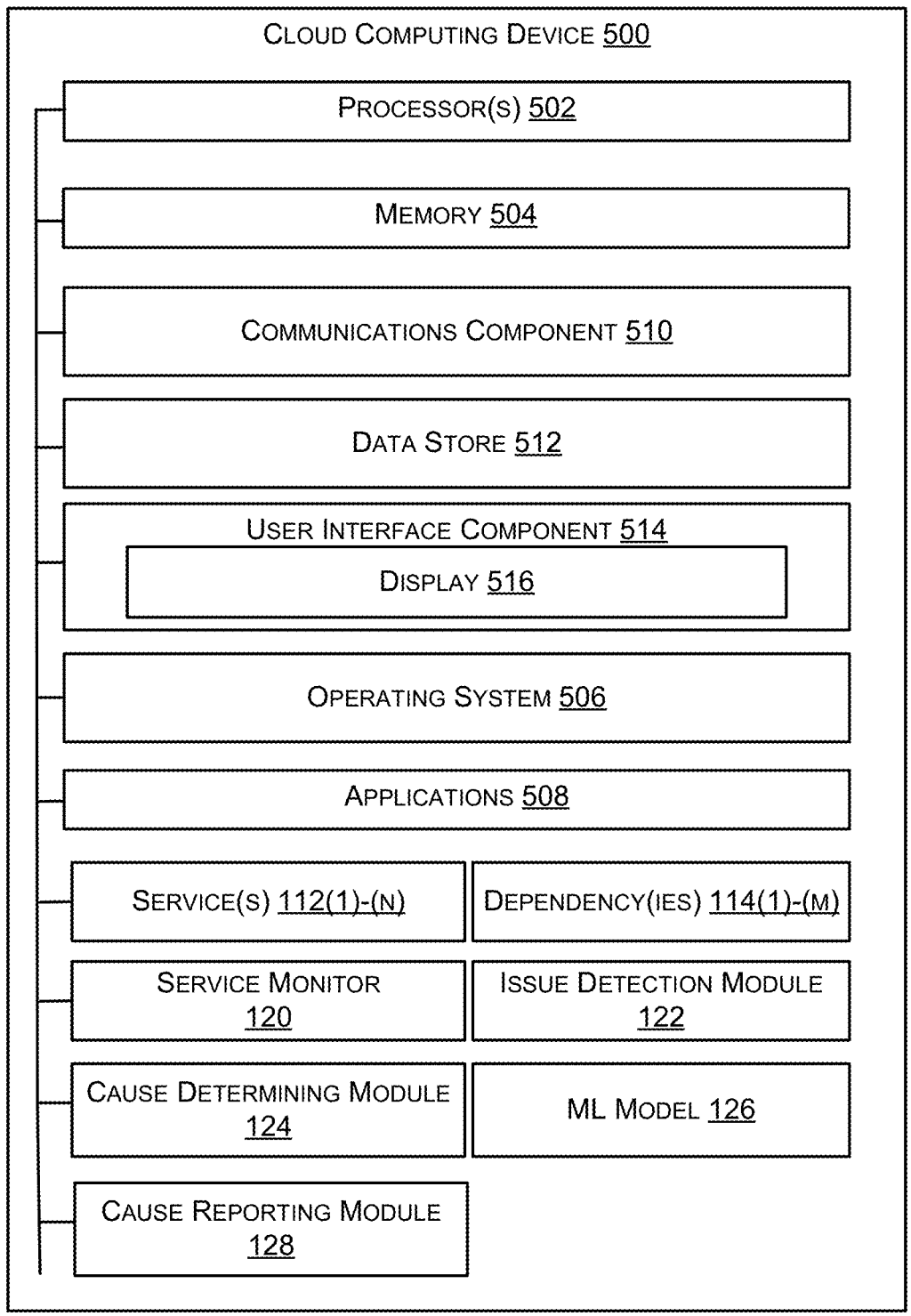
FIG. 9 is a block diagram illustrating an example of a hardware implementation for a cloud computing device(s), in accordance with some aspects of the present disclosure.

Referring now to FIG. 9, an example of a cloud computing device(s) 900 (e.g., cloud computing platform 102). In one example, the cloud computing device(s) 900 includes the processor 902 for carrying out processing functions associated with one or more of components and functions described herein. The processor 902 can include a single or multiple set of processors or multi-core processors. Moreover, the processor 902 may be implemented as an integrated processing system and/or a distributed processing system. In an example, the processor 902 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 902 may include other processing components such as one or more arithmetic logic units (ALUs), registers, or control units.

In an example, the cloud computing device 900 also includes the memory 904 for storing instructions executable by the processor 902 for carrying out the functions described herein. The memory 904 may be configured for storing data and/or computer-executable instructions defining and/or associated with the operating system 906, the file system entity(ies) 112(1)-(n), namespace service module(s) 114(1)-(m), change table(s) 116(1)-(p), change feed module 118, change feed ordering module 120, ordered change feed 122, change feed 212, and the processor 902 may execute the operating system 906, the file system entity(ies) 112(1)-(n), namespace service module(s) 114(1)-(m), change feed module 118, change feed ordering module 120, etc. and/or may store, in memory 904, change table(s) 116(1)-(p), change feed 212, ordered change feed 122, etc. An example of memory 904 may include, but is not limited to, a type of memory usable by a computer, such as random access memory (RAM), read only memory (ROM), tapes, magnetic discs, optical discs, volatile memory, non-volatile memory, and any combination thereof. In an example, the memory 904 may store local versions of applications being executed by processor 902.

The example cloud computing device 900 also includes a communications component 910 that provides for establishing and maintaining communications with one or more parties utilizing hardware, software, and services as described herein. The communications component 910 may carry communications between components on the cloud computing device 900, as well as between the cloud computing device 900 and external devices, such as devices located across a communications network and/or devices serially or locally connected to the cloud computing device 900. For example, the communications component 910 may include one or more buses, and may further include transmit chain components and receive chain components associated with a transmitter and receiver, respectively, operable for interfacing with external devices. In an implementation, for example, the communications component 910 may include a connection to communicatively couple the client devices 104(1)-(n) to the processor 902.

The example cloud computing device 900 also includes a data store 912, which may be any suitable combination of hardware and/or software, that provides for mass storage of information, databases, and programs employed in connection with implementations described herein. For example, the data store 912 may be a data repository for the operating system 906 and/or the applications 908.

The example cloud computing device 900 also includes a user interface component 914 operable to receive inputs from a user of the cloud computing device 900 and further operable to generate outputs for presentation to the user. The user interface component 914 may include one or more input devices, including but not limited to a keyboard, a number pad, a mouse, a touch-sensitive display (e.g., display 916), a digitizer, a navigation key, a function key, a microphone, a voice recognition component, any other mechanism capable of receiving an input from a user, or any combination thereof. Further, the user interface component 914 may include one or more output devices, including but not limited to a display (e.g., display 916), a speaker, a haptic feedback mechanism, a printer, any other mechanism capable of presenting an output to a user, or any combination thereof.

In an implementation, the user interface component 914 may transmit and/or receive messages corresponding to the operation of the operating system 906 and/or the applications 908. In addition, the processor 902 executes the operating system 906 and/or the applications 908, and the memory 904 or the data store 912 may store them.

Further, one or more of the subcomponents of the file system entity(ies) 112(1)-(n), namespace service module(s) 114(1)-(m), change table(s) 116(1)-(p), change feed module 118, change feed ordering module 120, ordered change feed 122, change feed 212, may be implemented in one or more of the processor 902, the applications 908, the operating system 906, memory 904, and/or the user interface component 914 such that the subcomponents of the file system entity(ies) 112(1)-(n), namespace service module(s) 114(1)-(m), change table(s) 116(1)-(p), change feed module 118, change feed ordering module 120, ordered change feed 122, change feed 212, may be spread out between the components/subcomponents of the cloud computing device 900.

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A computer-implemented method for ordering operations in a file system having a hierarchical namespace, comprising:
   determining, by a first service that manages file system operations for a first entity in the hierarchical namespace, to perform a file system operation for the first entity;
   generating, by the first service, a first counter record for the file system operation;
   based on determining to perform the file system operation, identifying a second entity in the hierarchical namespace that is a parent of the first entity in the hierarchical namespace, wherein the second entity is associated with a last file system operation and a second service that manages the file system operations on the second entity,
   wherein an entry of the first entity in the hierarchical namespace depends on an entry of the second entity in the hierarchical namespace in a parent-child relationship;
   based on the parent-child relationship, obtaining, from the second service, a second counter record for the last file system operation performed on the second entity, wherein the second counter record is generated by the second service;
   storing, in a change feed, an indication of the file system operation along with the first counter record for the file system operation and the second counter record for the last file system operation, wherein the change feed comprises a plurality of additional file system operations having corresponding counter records; and
   generating an ordered list of multiple file system operations stored in the change feed based on a set of counter records associated with each of the multiple file system operations, the multiple file system operations including the file system operation associated with the first counter record and the second counter record, and the plurality of additional file system operations associated with the corresponding counter records.

2. The computer-implemented method of claim 1, wherein the first counter record is one of a first monotonically incrementing counter or a first timestamp of a first logical clock associated with the first service, and wherein the second counter record is one of a second monotonically incrementing counter or a second timestamp of a second logical clock associated with the second service.

3. The computer-implemented method of claim 1, further comprising obtaining, based on determining to perform the file system operation and from a third service that manages file system operations on a third entity that is a parent of the second entity in the hierarchical namespace, a third counter record for a last file system operation performed on the third entity, wherein the third counter record is generated by the third service, and wherein storing the file system operation includes storing, in the change feed, the indication of the file system operation along with the third counter record.

4. The computer-implemented method of claim 1, wherein generating the ordered list of the multiple file system operations includes ordering, based on counter records associated with the second entity, a first set of file system operations executed on one or more entities other than the second entity and that depend on the last file system operation performed on the second entity before a second set of file system operations executed on the one or more entities other than the second entity and that depend on a previous file system operation performed on the second entity before the last file system operation performed on the second entity.

5. The computer-implemented method of claim 1, wherein generating the ordered list of multiple file system operations includes:
creating a directed acyclic graph (DAG) having nodes corresponding to each of the multiple file system operations and edges between the nodes having a direction determined based on the set of counter records corresponding to a corresponding one of the multiple file system operations; and
performing graph traversal of the DAG to generate the ordered list of the multiple file system operations.

6. The computer-implemented method of claim 1, further comprising executing the multiple file system operations from the ordered list on a redundant file system of the file system.

7. The computer-implemented method of claim 1, further comprising utilizing the ordered list of the multiple file system operations to provide a point-in-time restore of the file system.

8. A cloud computing device for ordering operations in a file system having a hierarchical namespace, comprising:
a memory storing instructions; and
at least one processor coupled to the memory and configured to execute the instructions to:
determine, by a first service that manages file system operations for a first entity in the hierarchical namespace, to perform a file system operation for the first entity;
generate, by the first service, a first counter record for the file system operation;
based on determining to perform the file system operation, identify a second entity in the hierarchical namespace that is a parent of the first entity in the hierarchical namespace, wherein the second entity is associated with a last file system operation and a second service that manages the file system operations on the second entity,
wherein an entry of the first entity in the hierarchical namespace depends on an entry of the second entity in the hierarchical namespace in a parent-child relationship;
based on the parent-child relationship, obtain, from the second service, a second counter record for the last file system operation performed on the second entity, wherein the second counter record is generated by the second service;
store, in a change feed, an indication of the file system operation along with the first counter record for the file system operation and the second counter record for the last file system operation, wherein the change feed comprises a plurality of additional file system operations having corresponding counter records; and
generate an ordered list of multiple file system operations stored in the change feed based on a set of counter records associated with each of the multiple file system operations, the multiple file system operation including the file system operation associated with the first counter record and the second counter record, and the plurality of additional file system operations associated with the corresponding counter records.

9. The cloud computing device of claim 8, wherein the first counter record is one of a first monotonically incrementing counter or a first timestamp of a first logical clock associated with the first service, and wherein the second counter record is one of a second monotonically incrementing counter or a second timestamp of a second logical clock associated with the second service.

10. The cloud computing device of claim 8, wherein the at least one processor is further configured to execute the instructions to obtain, based on determining to perform the file system operation and from a third service that manages file system operations on a third entity that is a parent of the second entity in the hierarchical namespace, a third counter record for a last file system operation performed on the third entity, wherein the third counter record is generated by the third service, and wherein the at least one processor is configured to execute the instructions to store, in the change feed, the indication of the file system operation along with the third counter record.

11. The cloud computing device of claim 8, wherein the at least one processor is configured to execute the instructions to generate the ordered list of the multiple file system operations at least in part by ordering, based on counter records associated with the second entity, a first set of file system operations executed on one or more entities other than the second entity and that depend on the last file system operation performed on the second entity before a second set of file system operations executed on the one or more entities other than the second entity and that depend on a previous file system operation performed on the second entity before the last file system operation performed on the second entity.

12. The cloud computing device of claim 8, wherein the at least one processor is configured to execute the instructions to generate the ordered list of multiple file system operations at least in part by:
creating a directed acyclic graph (DAG) having nodes corresponding to each of the multiple file system operations and edges between the nodes having a direction determined based on the set of counter records corresponding to a corresponding one of the multiple file system operations; and performing graph traversal of the DAG to generate the ordered list of the multiple file system operations.

13. The cloud computing device of claim 8, wherein the at least one processor is further configured to execute the instructions to execute the multiple file system operations from the ordered list on a redundant file system of the file system.

14. The cloud computing device of claim 8, wherein the at least one processor is further configured to execute the instructions to utilize the ordered list of the multiple file system operations to provide a point-in-time restore of the file system.

15. A non-transitory computer-readable device storing instructions thereon that, when executed by at least one computing device operating in a cloud computing platform, causes the at least one computing device to perform operations comprising:
- determining, by a first service that manages file system operations for a first entity in the hierarchical namespace, to perform a file system operation for the first entity;
- generating, by the first service, a first counter record for the file system operation;
- based on determining to perform the file system operation, identifying a second entity in the hierarchical namespace that is a parent of the first entity in the hierarchical namespace, wherein the second entity is associated with a last file system operation and a second service that manages the file system operations on the second entity,
- wherein an entry of the first entity in the hierarchical namespace depends on an entry of the second entity in the hierarchical namespace in a parent-child relationship;
- based on the parent-child relationship, obtaining, from the second service, a second counter record for the last file system operation performed on the second entity, wherein the second counter record is generated by the second service;
- storing, in a change feed, an indication of the file system operation along with the first counter record for the file system operation and the second counter record for the last file system operation, wherein the change feed comprises a plurality of additional file system operations having corresponding counter records; and
- generating an ordered list of multiple file system operations stored in the change feed based on a set of counter records associated with each of the multiple file system operations, the multiple file system operations including the file system operation associated with the first counter record and the second counter record, and the plurality of additional file system operations associated with the corresponding counter records.

16. The non-transitory computer-readable device of claim 15, wherein the first counter record is one of a first monotonically incrementing counter or a first timestamp of a first logical clock associated with the first service, and wherein the second counter record is one of a second monotonically incrementing counter or a second timestamp of a second logical clock associated with the second service.

17. The non-transitory computer-readable device of claim 15, the operations further comprising obtaining, based on determining to perform the file system operation and from a third service that manages file system operations on a third entity that is a parent of the second entity in the hierarchical namespace, a third counter record for a last file system operation performed on the third entity, wherein the third counter record is generated by the third service, and wherein storing the file system operation includes storing, in the change feed, the indication of the file system operation along with the third counter record.

18. The non-transitory computer-readable device of claim 15, the operations further comprising generating an ordered list of multiple file system operations stored in the change feed based on a set of counter records associated with each of the multiple file system operations, including the first counter record associated with the file system operation performed on the first entity and the second counter record associated with the last file system operation performed on the second entity.

19. The non-transitory computer-readable device of claim 15, wherein the code for generating the ordered list of multiple file system operations includes:
- code for creating a directed acyclic graph (DAG) having nodes corresponding to each of the multiple file system operations and edges between the nodes having a direction determined based on the set of counter records corresponding to a corresponding one of the multiple file system operations; and
- code for performing graph traversal of the DAG to generate the ordered list of the multiple file system operations.

20. The non-transitory computer-readable device of claim 15, further comprising code for executing the multiple file system operations from the ordered list on a redundant file system of the file system.

* * * * *